(12) United States Patent
Uemura et al.

(10) Patent No.: US 6,766,415 B1
(45) Date of Patent: Jul. 20, 2004

(54) DATA CACHING METHOD

(75) Inventors: Toyotoshi Uemura, Ehime (JP);
Tatsuya Sakanashi, Ehime (JP);
Fumitoshi Saito, Ehime (JP); Hiromi Matsuki, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 316 days.

(21) Appl. No.: 09/889,385

(22) PCT Filed: Nov. 16, 2000

(86) PCT No.: PCT/JP00/08072
§ 371 (c)(1),
(2), (4) Date: Sep. 19, 2001

(87) PCT Pub. No.: WO01/37074
PCT Pub. Date: May 25, 2001

(30) Foreign Application Priority Data

Nov. 17, 1999 (JP) .......................................... 11-327440

(51) Int. Cl.⁷ .............................. G06F 12/08; G06F 3/06
(52) U.S. Cl. ....................... 711/113; 711/133; 711/137; 711/159; 369/30.23
(58) Field of Search ............................. 711/113, 137, 711/4, 110, 133, 159; 710/52, 54, 56; 369/30.23, 47.32–47.34

(56) References Cited

U.S. PATENT DOCUMENTS

| | | | |
|---|---|---|---|
| 5,608,875 A | * 3/1997 | Mori | 711/4 |
| 5,615,353 A | * 3/1997 | Lautzenheiser | 711/136 |
| 5,881,031 A |   3/1999 | Asano et al. | 369/32 |
| 6,092,149 A | * 7/2000 | Hicken et al. | 711/113 |
| 6,141,728 A | * 10/2000 | Simionescu et al. | 711/113 |

FOREIGN PATENT DOCUMENTS

| | | |
|---|---|---|
| JP | 6-110613 | 4/1994 |
| JP | 7-319630 | 12/1995 |
| JP | 10208255 | 8/1998 |
| JP | 11259239 | 9/1999 |
| JP | 11-296309 | 10/1999 |

* cited by examiner

Primary Examiner—Denise Tran
(74) Attorney, Agent, or Firm—Wenderoth, Lind & Ponack, L.L.P.

(57) ABSTRACT

When a computer issues a reading request for data stored in a storage medium, it is judged whether or not the respective data for which the reading request is issued are in cache hit with data that are stored in a read buffer. Only data which are not in cache hit among the data for which the reading request is issued are read out from the storage medium, so as to be buffered in the read buffer. The data for which the reading request is issued are transferred from the read buffer to the computer, and data at addresses which are subsequent to the data for which the reading request is issued are pre-read from the storage medium and buffered in the read buffer so as to be continuous with the buffered read data. Thereby, it is possible to utilize cache data efficiently and effectively.

9 Claims, 7 Drawing Sheets

Read 50-52

Read 48-52

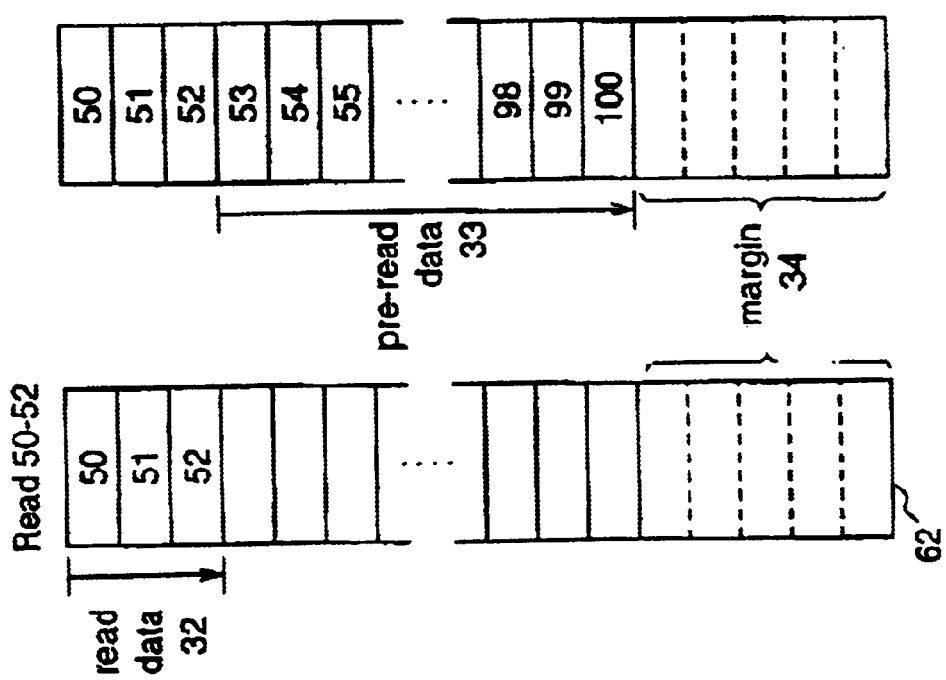
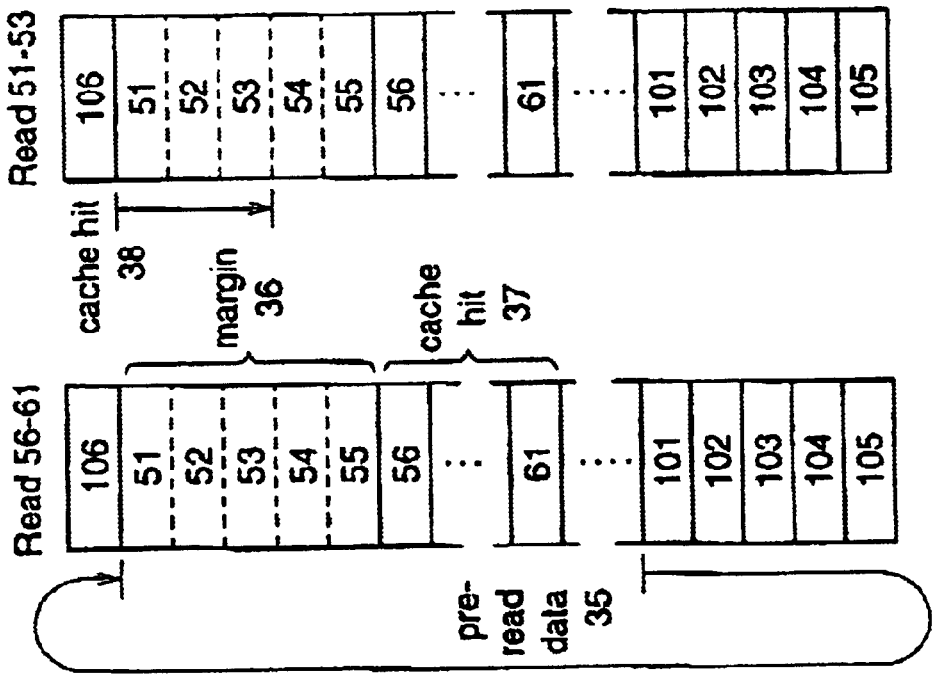

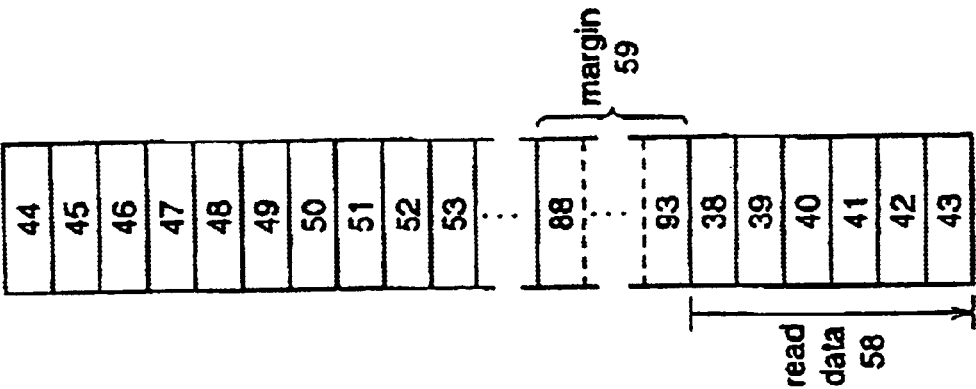
Fig.5(e) Read 38-46
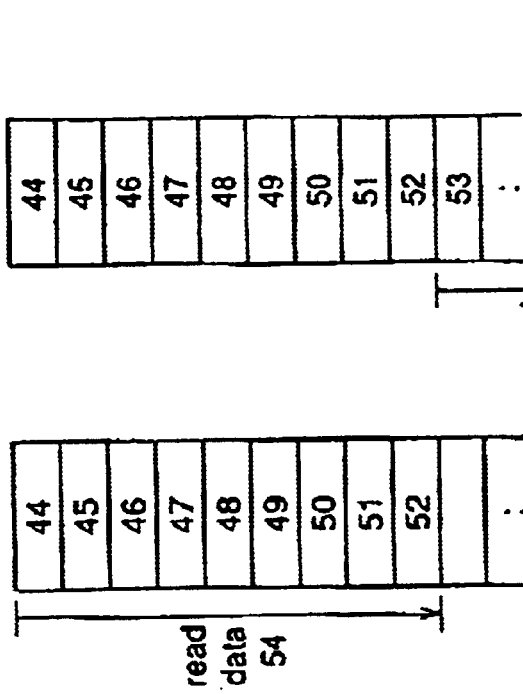
Fig.5(d)
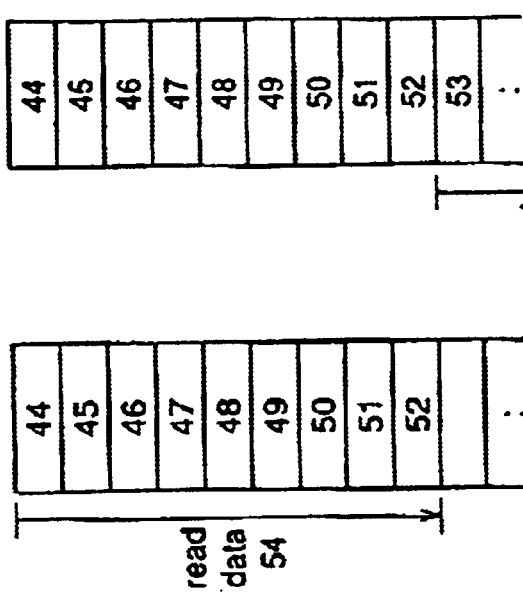
Fig.5(c) Read 44-52
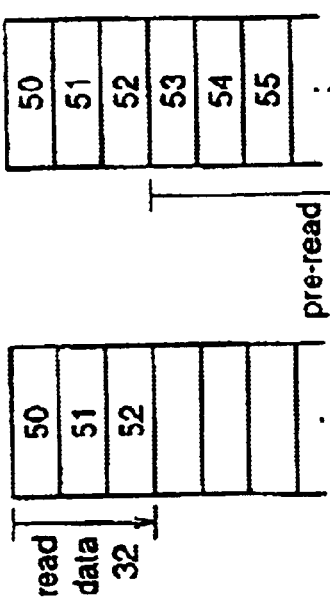
Fig.5(b)
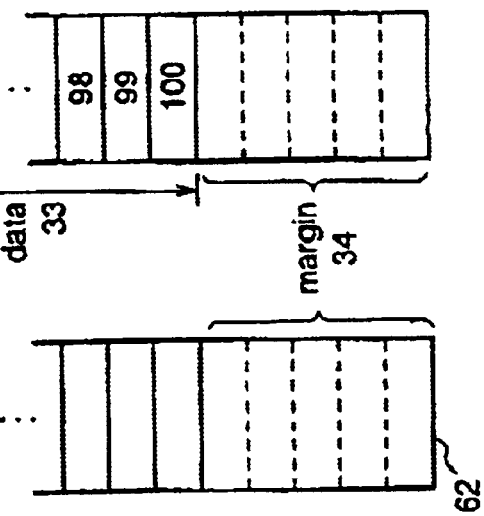
Fig.5(a) Read 50-52

PRIOR ART
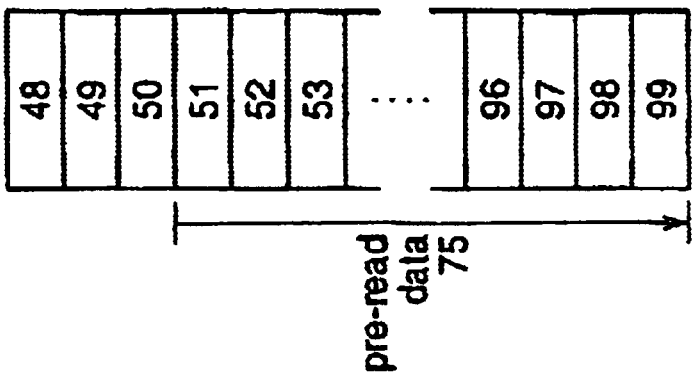
Fig.7(a) Fig.7(b)
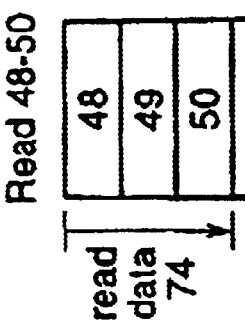 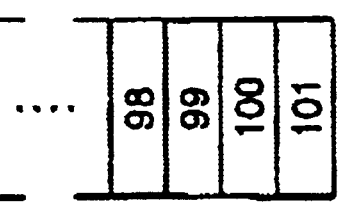
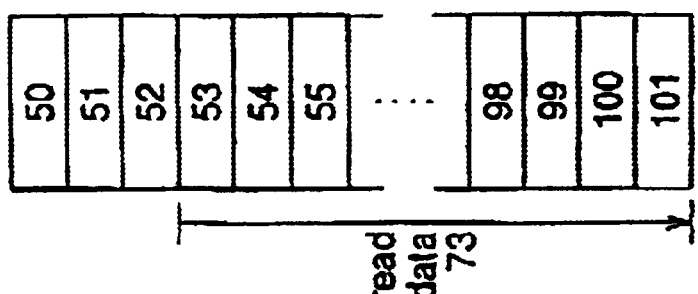
Fig.7(c) Fig.7(d)
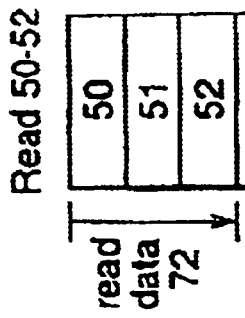 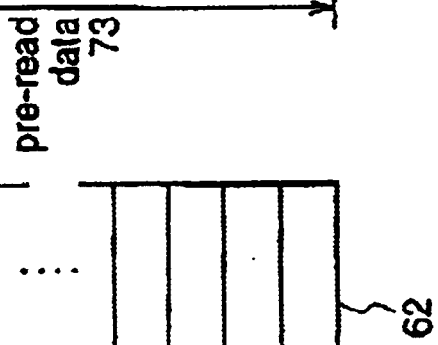

DATA CACHING METHOD

TECHNICAL FIELD

The present invention relates to a data caching method for caching data by employing a read buffer.

BACKGROUND ART

A conventional data caching method will be described with reference to the drawings. FIG. 6 is a block diagram illustrating an apparatus to which the conventional data caching method is applied. In FIG. 6, numeral 61 denotes a storage medium (e.g., a CD/DVD-ROM), numeral 62 denotes a read buffer, and numeral 63 denotes a computer.

FIGS. 7(a) to 7(d) are diagrams for explaining an example of changes in cache data in the conventional data caching method. Data stored in the read buffer 62, i.e., cache data, are changed in the order of FIGS. 7(a), 7(b), 7(c) and 7(d), in which numeral 62 denotes the read buffer, numeral 72 denotes read data, numeral 73 denotes pre-read data, numeral 74 denotes read data, and numeral 75 denotes pre-read data.

Next, the operation of the conventional data caching method will be described with reference to FIGS. 6 and 7(a)–7(d). When a computer 63 such as host computer issues a reading request for data at addresses 50 to 52 in a storage medium 61 such as a CD-ROM or DVD-ROM, the data at addresses 50 to 52 of the storage medium 61 are read out by a reading apparatus (not shown), and, as shown in FIG. 7(a), the read data 72 which have been read out from the storage medium 61 are buffered at the head of the read buffer 62 and are then transferred to the computer 63. Thereafter, data at address 53 and subsequent addresses of the storage medium 61 are pre-read by an amount which can be written in the available space of the read buffer 62. Then, as shown in FIG. 7(b), the pre-read data 73, i.e., data at addresses 53 to 101 which have been pre-read, are buffered up to the end position of the read buffer 62 so that the pre-read data 73 are made continuous with the read data 72.

Subsequently, when the computer 63 issues a reading request for data at addresses 48 to 50 of the storage medium 61, it is determined whether a cache hit occurs or not depending on whether or not data at address 48, as data at a reading starting position, are stored in the read buffer 62. Since the data at address 48 are not included in the read data 72 and the pre-read data 73 which have been stored in the read buffer 62, as shown in FIG. 7(b), the cache hit does not occur. Thus, data at addresses 48 to 50 of the storage medium 61 are read again, and, as shown in FIG. 7(c), the read data 74 which have been read out from the storage medium 61 are buffered at the head of the buffer memory 62 and are then transferred to the computer 63. Thereafter, data at addresses subsequent to address 50 of the storage medium 61 are pre-read by an amount which can be written in the available space of the read buffer 62. Then, as shown in FIG. 7(d), the pre-read data 75, i.e., data at addresses 51 to 99, are buffered up to the end position of the read buffer 62 so that the pre-read data 75 are made to be continuous with the read data 74.

As described above, in the conventional data caching method, even when part of data for which the computer 63 issues the reading requests have been previously stored in the read buffer 62, it is judged that the cache hit does not occur when data at the reading starting position are not stored, and reading is performed again from the storage medium 61 to rewrite all of data in the read buffer 62, thereby resulting in a lower efficiency.

Further, when the computer 63 issues a reading request for data which are not stored in the read buffer 62, even when the address of the data is slightly forward of the address of data that is stored in the read buffer 62, and there are few changes between pre-rewriting data and post-rewriting data, the data in the read buffer 62 are all rewritten. Accordingly, the efficiency is low.

The present invention is made in view of the above-described problems. The object of the present invention is to provide a data caching method which can utilize cache data efficiently and effectively.

SUMMARY OF THE INVENTION

According to the present invention, there is provided a data caching method for caching data by employing a read buffer when a computer issues a reading request for data stored in a storage medium. The data caching method comprises a step of determining whether the data that are stored in the storage medium, to which a reading request is issued are in cache hit with data which have already been buffered in the read buffer. The data caching method also comprises a buffering step of, when it is determined in the cache hit determination step that data for which the reading request is issued or a part thereof are not in cache hit, reading out only data, from the storage medium, which are not in cache hit among the data for which the reading request is issued to be buffered in the read buffer so as to be continuous with data which are in cache hit. The method also comprises a step of, after the buffering, transferring the data in the read buffer for which the reading request is issued to the computer. Further, the method comprises a pre-reading step of, after transferring the data for which the reading request is issued from the read buffer to the computer, pre-reading data which are stored in the storage medium that are subsequent to the data from the storage medium for which the reading request is issued, to be buffered in the read buffer so as to be continuous with the data in the read buffer for which the reading request is issued. Therefore, it is determined whether or not all of the data to which the computer issues the reading request are in cache hit, and only data which are not in cache hit are read out from the storage medium to be buffered in the read buffer. Therefore, there is no need to rewrite all of the data in the read buffer, and thus, it is possible to utilize cache data efficiently and effectively.

According to the present invention, in the aforementioned data caching method, in a case where data have already been stored in the read buffer so as to be continuous with the data for which the reading request is issued in the read buffer, the pre-reading step does not carry out the pre-reading. Therefore, there is no need to rewrite data which have already been stored in the read buffer, and thus, it is possible to utilize cache data efficiently and effectively.

According to the present invention, in the aforementioned data caching method, when it is determined in the cache hit determination step that at least rearmost (rear end position) data among the data for which the reading request is issued are in cache hit, the buffering step reads only data from the storage medium which are not in cache hit among the data for which the reading request is issued, and buffers the data immediately before the data which are in cache hit which have already been buffered in the read buffer so as to be followed by the data in cache hit. Therefore, even when the computer issues a reading request for data of addresses which precede the address(es) of the data to which the computer issues the reading request the last time, there is no need to re-read all of the data for which the reading request is issued from the storage medium, and the data can be transferred from the read buffer to the computer, whereby it is possible to utilize cache data efficiently and effectively.

According to the present invention, in the aforementioned data caching method, an arbitrarily-sized margin in which pre-read data are not recorded is provided at an end position of the read buffer. When the size of data which are not in cache hit among the data for which the reading request is issued is equal to or smaller than the size of the margin, the data which are not in cache hit are read out from the storage medium to be buffered in the margin so as to be continuous with the data in the read buffer. Therefore, there is no need to rewrite all of the data in the read buffer, whereby it is possible to utilize cache data efficiently and effectively.

According to the present invention, in the aforementioned data caching method, before the pre-reading step, the margin is set again immediately preceding the data for which the reading request is issued. Therefore, the margin is always provided at the end section of the data in the read buffer, whereby it is possible to utilize cache data efficiently and effectively.

According to the present invention, in the aforementioned data caching method, the size of the margin can be changed into an arbitrary size on the basis of a past buffering state. Therefore, the margin can always have an optimal size, whereby it is possible to utilize cache data efficiently and effectively.

BRIEF DESCRIPTION OF THE DRAWINGS

FIGS. 3(a) to 3(d) are diagrams for explaining an example of changes in cache data in a case where all of the data for which a reading request is issued are in cache hit in a data caching method according to a second embodiment of the present invention.

FIGS. 5(a) to 5(e) are diagrams for explaining an example of changes in cache data in a case where the size of a margin is set again in a data caching method according to a fourth embodiment of the present invention.

FIGS. 7(a) to 7(d) are diagrams for explaining an example of changes in cache data in the conventional data caching method.

DETAILED DESCRIPTION OF THE INVENTION

First Embodiment

Hereinafter, a data caching method according to a first embodiment of the present invention will be described with reference to the drawings.

Figure 6:
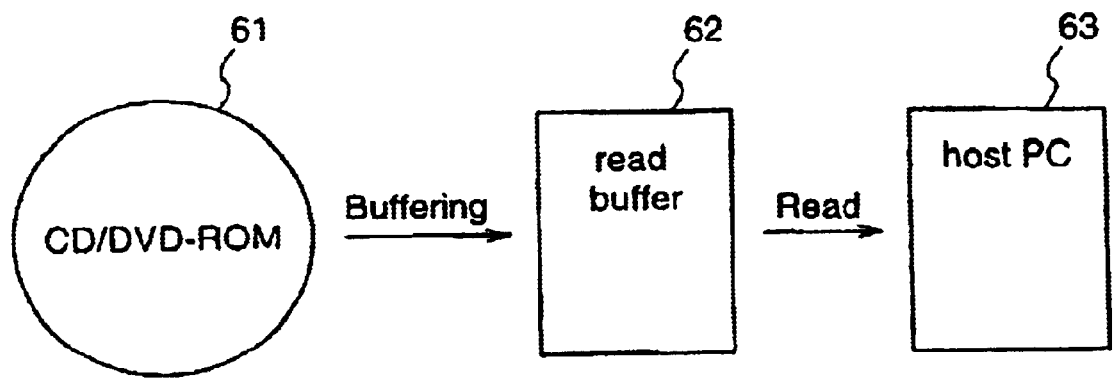
FIG. 6 is a block diagram illustrating an apparatus to which a conventional data caching method is applied.

Since the structure of an apparatus to which the data caching method according to the first embodiment is applied is the same as that of the apparatus to which the conventional data caching method is applied, as shown in FIG. 6, a description of the apparatus for the first embodiment is omitted.

Figure 1:
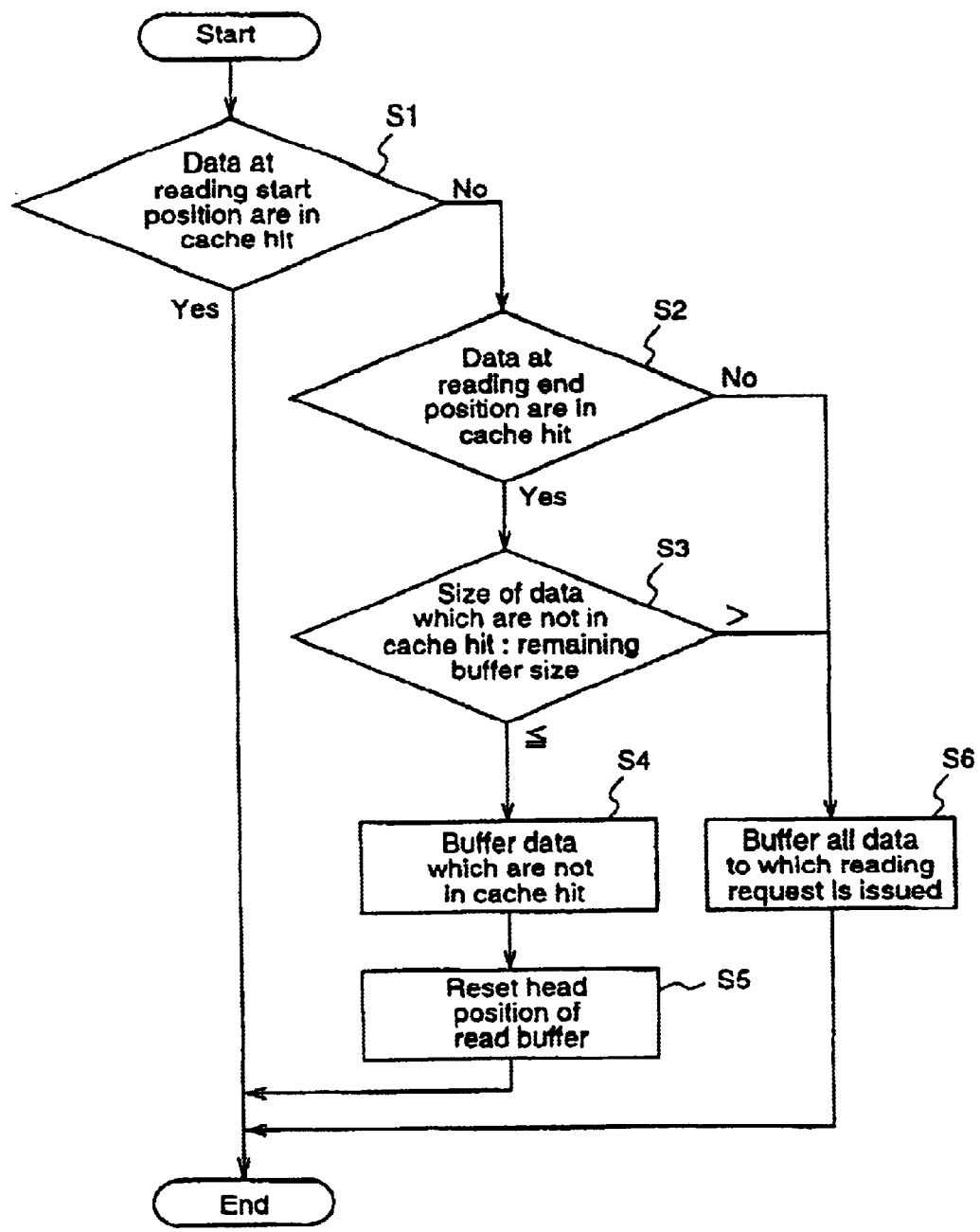
FIG. 1 is a flowchart showing a buffering procedure of a read buffer in a data caching method according to a first embodiment of the present invention.

A description is given of a buffering operation of a read buffer in the data caching method according to the first embodiment with reference to FIG. 1. FIG. 1 is a flowchart showing a buffering procedure of the read buffer 62 in the data caching method according to the first embodiment.

At first, the computer 63 issues a reading request for data that is stored in the storage medium 61. In step S1, it is determined whether or not the head data among the data for which the reading request is issued (hereinafter, referred to as reading start position data) are in cache hit. When the data at the reading start position are in cache hit, the operation goes through processes without reading any data from the storage medium 61. On the other hand, when the data at the reading start position are not in cache hit, the operation proceeds to step S2. In step S2, it is determined whether or not the rearmost data among the data for which the reading request is issued (hereinafter, referred to as reading end position data) are in cache hit. When the data at the reading end position are not in cache hit, the operation proceeds to step S6, and all of the data for which the reading request is issued are read out from the storage medium 61 so as to be buffered at the head position of the read buffer 62. On the other hand, when the data at the reading end position are in cache hit, the operation proceeds to step S3. In step S3, the size of the data which are not in cache hit among the data for which the reading request is issued is compared with the remaining buffer size, which is obtained by excluding, from the read buffer 62, the cache-hit data among the data for which the reading request is issued. When the size of the data which are not in cache hit is larger than the remaining buffer size, the operation proceeds to step S6. On the other hand, when the size of the data which are not in cache hit is equal to or smaller than the remaining buffer size, the operation proceeds to step S4. In step S4, the data which are not in cache hit among the data for which the reading request is issued are read out from the storage medium 61 so as to be buffered in the read buffer 62 so that the data which are not in cache hit are made continuous with the cache-hit data. In step S5, a head position of the data that is stored in the read buffer 62, for which the computer 63 issues the reading request, is set again as a head position of the read buffer so as to end the buffering process of the data for which the reading request is issued.

Figure 2A:
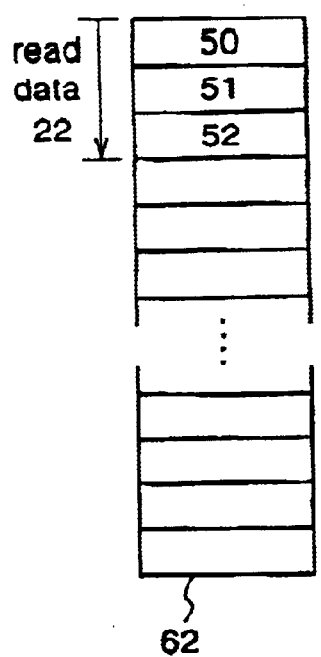
FIGS. 2(a) to 2(c) are diagrams for explaining an example of changes in cache data in the data caching method according to the first embodiment of the present invention.
Figure 2B:
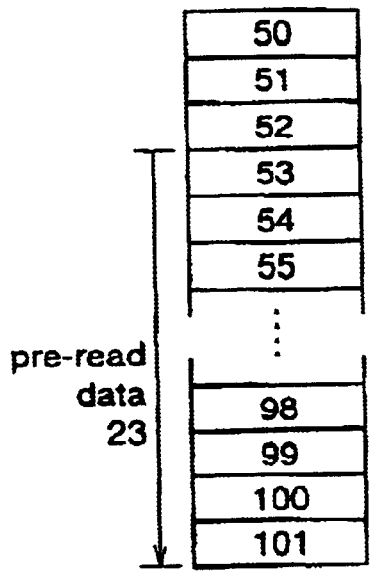
Figure 2C:
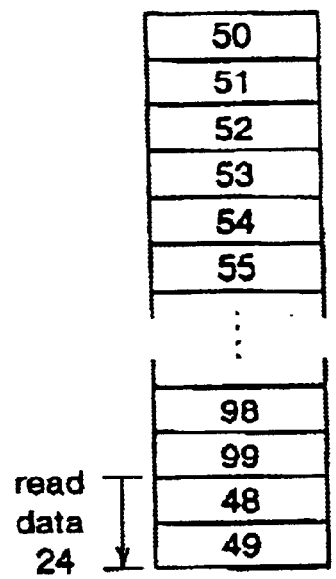

Next, with reference to the drawings, the data caching method according to the first embodiment of the present invention will be described with an explanation of an example of the changes in the data in the read buffer 62. FIGS. 2(a) to 2(c) are diagrams for explaining an example of the changes in the cache data in the data caching method according to the first embodiment of the present invention. The cache data are changed in the order of FIGS. 2(a), 2(b) and 2(c), in which numeral 62 denotes a read buffer, numeral 22 denotes read data, numeral 23 denotes pre-read data, and numeral 24 denotes read data.

When the computer 63 issues a reading request for data at addresses 50 to 52 of the storage medium 61, it is determined, in step S1, whether or not the data at address 50 are stored in the read buffer 62. In this example, the operation proceeds to step S2 because the data at address 50 are not stored in the read buffer 62. In step S2, it is determined whether or not the data at address 52 are stored in the read buffer 62. In this example, the operation proceeds to step S6 because the data at address 52 are not stored in the read buffer 62. In step S6, the data at addresses 50 to 52 of the storage medium 61 are read out by a reading apparatus (not shown). The read data 22 which have been read out from the storage medium 61, i.e., data at addresses 50–52, are buffered at the head of the read buffer 62 as shown in FIG. 2(a). Then, the buffering process for the data is ended, and the data for which the reading request is issued are transferred from the read buffer 62 to the computer 63. Thereafter, data at address 53 and subsequent addresses of the storage medium 61 are pre-read by the amount which can be written in the available space of the read buffer 62, and the pre-read data 23, i.e., data at addresses 53 to 101 which have been pre-read, are buffered up to an end position of the read buffer 62 so that the pre-read data 23, 101 are made to be continuous with the read data 22, as shown in FIG. 2(b).

Subsequently, when the computer 63 issues a reading request for data at addresses 48 to 50 of the storage medium 61, it is determined, in step S1, whether or not the data at address 48, as the reading start position data, are stored in the read buffer 62. In this example, the operation proceeds to step S2 because the reading start position data at address 48 are not stored in the read buffer 62. In step S2, it is determined whether or not the data at address 50, as the reading end position data, are stored in the read buffer 62. In this example, the operation proceeds to step S3 because the data at address 50 have already been stored in the read buffer 62. In step S3, it is decided that the data at addresses 48 and 49, which are not stored in the read buffer 62, can be buffered into the read buffer 62, and the operation proceeds to step S4. In step S4, the data at addresses 48 and 49, which are not stored in the read buffer 62, are read out from the storage medium 61, and are buffered so that the read data 24 at addresses 48 and 49 which have been read from the storage medium 61 are made to be continuous with the data at address 50 and the following addresses, as shown in FIG. 2(c). The read buffer 62 here has a ring structure. Then, the data for which the reading request is issued are transferred to the computer 63. Thereafter, in step S5, the part of the read buffer 62 where the data at address 48, as the reading start position data, are stored is set again as a head position of the read buffer 62.

As described above, in the data caching method according to the first embodiment of the present invention, in a case where part of the data for which a reading request is issued has already been stored in the read buffer, only data which are not stored in the read buffer are read from the storage medium to be buffered so as to be continuous with the data already stored in the read buffer. Therefore, there is no need to rewrite all the data in the read buffer, whereby it is possible to utilize cache data efficiently and effectively.

Second Embodiment

Hereinafter, a data caching method according to a second embodiment of the present invention will be described with reference to the drawings.

Since the structure of an apparatus to which the data caching method according to the second embodiment is applied is the same as that of the apparatus to which the conventional data caching method is applied as shown in FIG. 6, a description of the apparatus for the second embodiment is omitted.

With reference to the drawings, the data caching method according to the second embodiment will be described with an explanation of an example of changes in the data in the read buffer 62. FIGS. 3(a) to 3(d) are diagrams for explaining an example of the changes in cache data in the data caching method according to the second embodiment. The cache data are changed in the order of FIGS. 3(a), 3(b), 3(c) and 3(d), in which numeral 62 denotes a read buffer, numeral 32 denotes read data, numeral 33 denotes pre-read data, numeral 34 denotes a margin, numeral 35 denotes pre-read data, numeral 36 denotes a margin, numeral 37 denotes cache data, and numeral 38 denotes cache data.

Next, the operation of the data caching method according to the second embodiment will be described with reference to FIGS. 3(a) to 3(d). In this example, when the computer 63 issues a reading request for data at addresses 50 to 52 of the storage medium 61, the data at addresses 50 to 52 of the storage medium 61 are read out from the storage medium 61 by a reading apparatus (not shown). As shown in FIG. 3(a), the read data 32 which have been read from the storage medium 61 are buffered at the head of the read buffer 62 and are then transferred to the computer 63. Thereafter, data at address 53 and the following addresses of the storage medium 61 are pre-read from the storage medium 61 by the amount which can be written in the available space of the read buffer 62 apart from the margin 34 which is set at the end position of the read buffer 62 by 5 addresses in which pre-read data are not stored in the read buffer 62. Then, as shown in FIG. 3(b), the pre-read data 33, i.e., data at addresses 53 to 100 which have been pre-read, are buffered so as to be continuous with the read data 32 up to an address which immediately precedes the margin 34.

Subsequently, assume that a reading request for data at addresses 56 to 61 of the storage medium 61 is issued by the computer 63. Since all of the data at addresses 56 to 61 are in the read buffer 62 and are cache-hit, the cache data 37 are transferred from the read buffer 62 to the computer 63. Thereafter, as shown in FIG. 3(c), the head position of the read buffer 62 is set at the head position of the cache data 37, and the end position of the read buffer 62 (in this example, data at address 106) is set at an address which immediately precedes the head position of the read buffer 62. A margin 36 is set at the end position of the read buffer 62 by 5 addresses, which is the same as that of the margin 34. Thereafter, data at address 101 and the following addresses of the storage medium 61 are pre-read by the amount which can be written from the head position of the margin 34 up to the address which immediately precedes the margin 36. As shown in FIG. 3(c), the pre-read data 35, i.e., data at addresses 101 to 106 which have been pre-read, are buffered. The read buffer 62 here has a ring structure.

Subsequently, when the computer 63 issues a reading request for data at addresses 51 to 53 which are forward addresses of the data at addresses 56 to 61 of the storage medium 61, for which the reading request was issued the last time, since the data at addresses 51 to 53 are in the read buffer 62 as shown in FIG. 3(d) and are cache-hit, the cache data 38 are transferred from the read buffer 62 to the computer 63. Further, since the data at address 51, as the reading start position data, are data at the head position of the margin 36, there is no need to pre-read the data.

As described above, in the data caching method according to the second embodiment of the present invention, an arbitrarily-sized margin that is not rewritten by the pre-read data is set at the end position of the read buffer, whereby data to which the reading request was issued the last time remain in the read buffer. It is thereby possible to utilize cache data efficiently and effectively.

Further, when all of the data for which the reading request is issued are cache-hit, the setting is changed such that the head position of the cache data is the head position of the read buffer, and an address immediately preceding the head position of the read buffer is the end position of the buffer. Further, the position of a margin provided at the end position of the buffer is also changed, whereby the data to which the reading request was issued the last time remain in the buffer, and thus, it is possible to utilize cache data efficiently and effectively.

Third Embodiment

Hereinafter, a data caching method according to a third embodiment of the present invention will be described with reference to the drawings.

Since the structure of an apparatus to which the data caching method according to the third embodiment is applied is the same as that of the apparatus to which the conventional data caching method is applied, as shown in FIG. 6, a description of the apparatus for the third embodiment is omitted.

Figure 4A:
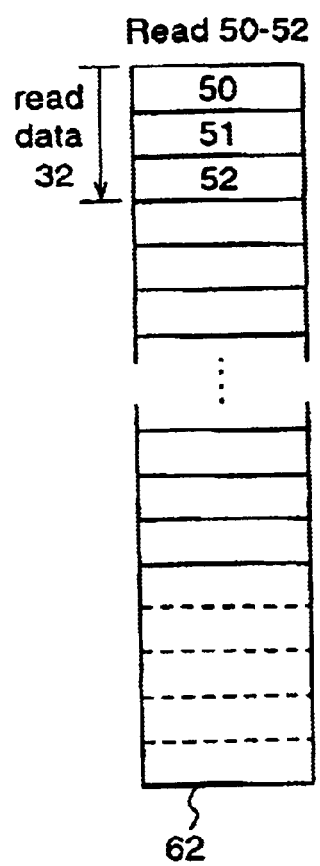
FIGS. 4(a) to 4(c) are diagrams for explaining an example of changes in cache data in a case where part of the data for which a reading request is issued are in cache hit in a data caching method according to a third embodiment of the present invention.
Figure 4B:
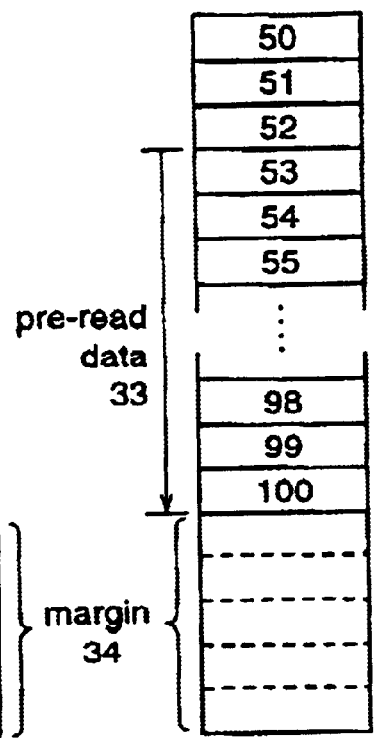
Figure 4C:
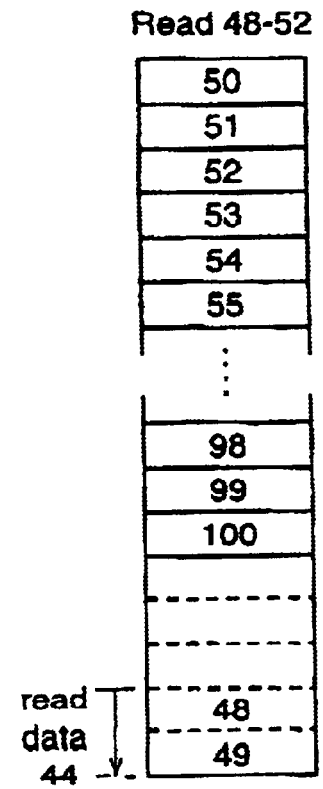

With reference to the drawings, the data caching method according to the third embodiment will be described with an explanation of an example of changes in the data in the read buffer 62. FIGS. 4(a) to 4(c) are diagrams for explaining an example of the changes in cache data in the data caching method according to the third embodiment. The cache data are changed in the order of FIGS. 4(a), 4(b) and 4(c), in which numeral 62 denotes a read buffer, numeral 32 denotes read data, numeral 33 denotes pre-read data, numeral 34 denotes a margin, and numeral 44 denotes read data.

Next, the operation of the data caching method according to the third embodiment will be described with reference to FIGS. 4(a) to 4(c). When the computer 63 issues a reading request for data at addresses 50 to 52 of the storage medium 61, the data at addresses 50 to 52 of the storage medium 61 are read out from the storage medium 61 by a reading apparatus (not shown) As shown in FIG. 4(a), the read data 32 which have been read out from the storage medium 61 are buffered at the head position of the read buffer 62.Then, the buffering process of the data is ended, and the data for which the reading request is issued are transferred from the read buffer 62 to the computer 63. Thereafter, data at address 53 and the following addresses of the storage medium 61 are pre-read by the amount which can be written in the available space of the read buffer 62 apart from the margin 34 which is set at the end position of the read buffer 62 by 5 addresses in which pre-read data are not stored in the read buffer 62. As shown in FIG. 4(b), the pre-read data 33, i.e., data at addresses 53 to 100 which have been pre-read, are buffered so as to be continuous with the read data 32 up to an address which immediately precedes the margin 34, as shown in FIG. 4(b).

Subsequently, assume that a reading request for data at addresses 48 to 52 of the storage medium 61 is issued by the computer 63. The data at addresses 50 to 52 have been already stored in the read buffer 62. On the other hand, the data at addresses 48 and 49 are not stored in the read buffer 62. Further, the size of the data which are not stored is smaller than that of the margin 34. In this case, the data at addresses 48 and 49 are read out from the storage medium 61. As shown in FIG. 4(c), the read data 44 which have been read out, i.e., data at addresses 48 and 49, are buffered at the end position of the margin 34 so that the data in the read buffer 62 are made continuous. Then, the data at addresses 48 to 52 of the storage medium 61 are transferred to the computer 63. The read buffer 62 here has a ring structure.

As described above, in the data caching method according to the third embodiment, a margin which are not rewritten by the pre-read data is set at the end position of the read buffer.

Accordingly, in a case where part of the data for which the reading request is issued are stored in the read buffer, only data which are not stored in the read buffer are read out from the storage medium so as to be buffered at the end position of the margin and transferred to the computer, whereby there is no need to rewrite all of data in the read buffer, and thus, it is possible to utilize cache data efficiently and effectively.

Fourth Embodiment

Hereinafter, a data caching method according to a fourth embodiment of the present invention will be described with reference to the drawings.

Since the structure of an apparatus to which the data caching method according to the fourth embodiment is applied is the same as that of the apparatus to which the conventional data caching method is applied, as shown in FIG. 6, a description of the apparatus for the fourth embodiment is omitted.

With reference to the drawings, the data caching method according to the fourth embodiment will be described with a description of an example of changes in data in the read buffer 62. FIGS. 5(a) to 5(e) are diagrams for explaining an example of the changes in the cache data in the data caching method according to the fourth embodiment. The cache data are changed in the order of FIGS. 5(a), 5(b), 5(c), 5(d) and 5(e), in which numeral 62 denotes a read buffer, numeral 32 denotes read data, numeral 33 denotes pre-read data, numeral 34 denotes a margin, numeral 54 denotes read data, numeral 55 denotes an increase in a margin, numeral 56 denotes a margin, numeral 57 denotes pre-read data, numeral 58 denotes read data, and numeral 59 denotes a margin.

Next, the operation of the data caching method according to the fourth embodiment will be described with reference to FIGS. 5(a) to 5(e). When the computer 63 issues a reading request for data at addresses 50 to 52 of the storage medium 61, the data at addresses 50 to 52 of the storage medium 61 are read out from the storage medium 61 by a reading apparatus (not shown). As shown in FIG. 5(a), the read data 32 which have been read out from the storage medium 61 are buffered at the head of the read buffer 62. Then, the buffering process of the data is ended, and the data for which the reading request is issued are transferred from the read buffer 62 to the computer 63. Thereafter, data at address 53 and the following addresses of the storage medium 61 are pre-read by the amount which can be written in the available space of the read buffer 62 apart from the margin 34 that is set at the end position of the read buffer 62 by 5 addresses in which pre-read data are not stored in the read buffer 62. The pre-read data 33, i.e., data at addresses 53 to 100 which have been pre-read, are buffered so as to be continuous with the read data 32 up to an address which immediately precedes the margin 34, as shown in FIG. 5(b).

Subsequently, assume a reading request for data at addresses 44 to 52 of the storage medium 61 is issued by the computer 63. The data at addresses 50 to 52 have already been stored in the read buffer 62. The data at addresses 44 to 49, however, are not stored in the read buffer 62. In addition, the size of the data which are not stored is larger than that of the margin 34. In this case, the data at addresses 44 to 52 in the storage medium 61 are read again, and the read data 54 which have been read again are buffered at the head of the read buffer 62, as shown in FIG. 5(c), and are then transferred to the computer 63. Then, the size of the margin is changed into the same size as that of the data which were not stored in the read buffer 62. The size of the data which were not buffered is 6 addresses, whereas the size of the margin 34 is 5 addresses. Therefore, the size of the increase 55 in the margin is equal to 1 address. The margin 56 of 6 addresses is newly set again at the end position of the read buffer 62. Thereafter, as shown in FIG. 5(d), data at address 53 and the following addresses of the storage medium 61 are pre-read from the storage medium 61 by the amount which can be written in the available space of the read buffer 62 apart from the margin 56, and the pre-read data 57, i.e., data at addresses 53 to 93 which have been pre-read, are buffered so as to be continuous with the read data 54 up to an address which immediately precedes the margin 56.

Subsequently, assume that a reading request for data at addresses 38 to 46 of the storage medium 61 is issued by the computer 63. The data at addresses 44 to 46 have already been stored in the read buffer 62. The data at addresses 38 to 43, however, are not stored in the read buffer 62. In addition, the size of the data which are not stored, i.e., data at addresses 38 to 43, is the same size as the margin 56. In this case, the data at addresses 38 to 43 are read out from the storage medium 61. As shown in FIG. 5(e), the read data 58 which have been read out are buffered from the head of the margin 56. The read buffer 62 here has a ring structure. Then, the data for which the reading request is issued are transferred to the computer 63. Thereafter, the head position of the read buffer 62 is set at the head position of the read data 58, and the end position of the read buffer is set at an address which immediately precedes the head position of the read buffer 62. Further, the margin 59 of 6 addresses, which has the same size as that of the margin 56, is set again at the end position of the read buffer 62.

As described above, in the data caching method according to the fourth embodiment, the margin, which are not rewritten by the pre-read data, is set at the end position of the read buffer. Accordingly, in a case where part of the data for which the reading request is issued are stored in the read buffer and the size of data which are not stored in the read buffer is larger than the size of the margin, the size of the margin is set again to the size of the data which are not stored in the read buffer, whereby the margin always has an optimal size. As a result, it is possible to utilize cache data efficiently and effectively.

As described above, a data caching method according to the present invention is suitable for a caching method for caching data in a CD, a CD-ROM, a CD-R (CD-Recordable), a CD-RW (CD-Re-Writable), a DVD-ROM (DVD-Read only Memory), a DVD-RAM (DVD-Random Access Memory) or the like.

What is claimed is:

1. A data caching method for caching data in a read buffer when a computer issues a reading request for data stored in a storage medium, said method comprising:

determining whether data stored in the storage medium for which data a reading request is issued are in cache hit with data which have already been buffered in the read buffer;

buffering only data in the read buffer which are not in cache hit so that the data which are not in cache hit are continuous with data in the read buffer which are in cache hit by reading out only the data from the storage medium which are not in cache hit among the data for which the reading request is issued when said determining of whether the data for which the reading request is issued are in cache hit determines that the data for which the reading request is issued or a part thereof are not in cache hit;

transferring the data in the read buffer for which the reading request is issued to the computer after said buffering of the data; and pre-reading data which are stored in the storage medium subsequent to the data for which the reading request is issued so that the pre-read data are buffered to be continuous with the data for which the reading request is issued in the read buffer after said transferring of the data;

wherein when said determining of whether data for which the reading request is issued are in cache hit determines that at least rearmost data among the data for which the reading request is issued are in cache hit, said buffering of the data reads only data from the storage medium which are not in cache hit among the data for which the reading request is issued, and buffers the read data immediately before the data which are in cache hit that have already been buffered in the read buffer so as to precede the data which are in cache hit in the read buffer.

2. The data caching method according to claim 1, wherein said pre-reading of the data does not pre-read data which have already been stored in the read buffer that are continuous with and subsequent to the data for which the reading request is issued.

3. The data caching method according to claim 1, wherein an arbitrarily sized margin in which the pre-read data is not stored therein is provided at an end position of the read buffer, and when a size of the data which are not in cache hit among the data for which the reading request is issued is equal to or smaller than a size the margin, the data which are not in cache hit are read out from the storage medium to be buffered in the margin so as to be continuous with the data in the read buffer which are in cache hit.

4. The data caching method according to claim 3, wherein the margin is set again immediately before the data for which the reading request is issued prior to said pre-reading of the data.

5. The data caching method according to claim 4, wherein the size of the margin can be changed into an arbitrary size on the basis of a past buffering state.

6. A data caching method for caching data in a read buffer when a computer issues a reading request for data stored in a storage medium, said method comprising:

determining whether data stored in the storage medium for which data a reading request is issued are in cache hit with data which have already been buffered in the read buffer;

buffering only data in the read buffer which are not in cache hit so that the data which are not in cache hit are continuous with data in the read buffer which are in cache hit by reading out only the data from the storage medium which are not in cache hit among the data for which the reading request is issued when said determining of whether the data for which the reading request is issued are in cache hit determines that the data for which the reading request is issued or a part thereof are not in cache hit;

transferring the data in the read buffer for which the reading request is issued to the computer after said buffering of the data; and pre-reading data which are stored in the storage medium subsequent to the data for which the reading request is issued so that the pre-read data are buffered to be continuous with the data for which the reading request is issued in the read buffer after said transferring of the data;

wherein
an arbitrarily sized margin in which the pre-read data is not stored therein is provided at an end position of the read buffer, and when a size of the data which are not in cache hit among the data for which the reading request is issued is equal to or smaller than a size the margin, the data which are not in cache hit are read out from the storage medium to be buffered in the margin so as to be continuous with the data in the read buffer which are in cache hit.

7. The data caching method according to claim 6, wherein said pre-reading of the data does not pre-read data which have already been stored in the read buffer that are continuous with and subsequent to the data for which the reading request is issued.

8. The data caching method according to claim 6, wherein the margin is set again immediately before the data for which the reading request is issued prior to said pre-reading of the data.

9. The data caching method according to claim 8, wherein the size of the margin can be changed into an arbitrary size on the basis of a past buffering state.

* * * * *